(12) United States Patent
Tasaki et al.

(10) Patent No.: US 12,173,634 B2
(45) Date of Patent: Dec. 24, 2024

(54) PARTICULATE FILTER

(71) Applicant: Cataler Corporation, Kakegawa (JP)

(72) Inventors: Ryo Tasaki, Kakegawa (JP); Ryota Onoe, Kakegawa (JP); Masaya Ito, Kakegawa (JP); Momoko Iwai, Kakegawa (JP); Yamato Matsushita, Kakegawa (JP)

(73) Assignee: Cataler Corporation, Kakegawa (JP)

( * ) Notice: Subject to any disclaimer, the term of this patent is extended or adjusted under 35 U.S.C. 154(b) by 0 days.

(21) Appl. No.: 18/568,875

(22) PCT Filed: Dec. 9, 2021

(86) PCT No.: PCT/JP2021/045310
§ 371 (c)(1),
(2) Date: Dec. 11, 2023

(87) PCT Pub. No.: WO2022/269947
PCT Pub. Date: Dec. 29, 2022

(65) Prior Publication Data
US 2024/0280038 A1    Aug. 22, 2024

(30) Foreign Application Priority Data

Jun. 23, 2021 (JP) .................................. 2021-104292

(51) Int. Cl.
*F01N 3/035* (2006.01)
*B01D 39/20* (2006.01)
(Continued)

(52) U.S. Cl.
CPC ........... *F01N 3/035* (2013.01); *F01N 3/0224* (2013.01); *B01D 39/20* (2013.01);
(Continued)

(58) Field of Classification Search
CPC combination set(s) only.
See application file for complete search history.

(56) References Cited

U.S. PATENT DOCUMENTS

| 2004/0053781 A1 | 3/2004 | Okawara |
| 2009/0193796 A1* | 8/2009 | Wei .................. F01N 3/0814 60/299 |

(Continued)

FOREIGN PATENT DOCUMENTS

| EP | 2174701 A1 | 4/2010 |
| EP | 2614872 A1 | 7/2013 |

(Continued)

OTHER PUBLICATIONS

International Preliminary Report on Patentability in PCT/JP2021/045310, dated Jan. 4, 2024 (7 pages).

(Continued)

*Primary Examiner* — Binh Q Tran
(74) *Attorney, Agent, or Firm* — Occhiuti & Rohlicek LLP

(57) ABSTRACT

The technology disclosed herein provides a particulate filter that can appropriately avoid PM from passing toward the outlet cell and can exhibit an excellent PM capturing performance. The particulate filter 1 disclosed herein includes: an outercoat layer 20 provided on an inlet surface 16*a* of a partition 16 of a base material 10. The outercoat layer 20 at least includes: a lower layer 22 provided on the inlet surface 16*a* of the partition 16; and an upper layer 24 provided to cover the lower layer 22. The mean particle diameter of granules contained in the upper layer 24 is higher than the mean particle diameter of granules contained in the lower layer. The mean particle diameter of the granules in the lower layer 22 is from 0.4 μm to 2.0 μm inclusive, and the mean particle diameter of the granules in the upper layer 24 is from 2.0 μm to 7.0 μm inclusive. With such a configura- (Continued)

tion, PM can be captured in an inlet cell 12, thereby suitably avoiding PM from passing toward an outlet cell 14 and exhibiting an excellent PM capturing performance.

20 Claims, 5 Drawing Sheets

(51) Int. Cl.
  *B01D 46/24* (2006.01)
  *B01D 53/94* (2006.01)
  *B01J 20/32* (2006.01)
  *B01J 23/63* (2006.01)
  *B01J 35/56* (2024.01)
  *F01N 3/022* (2006.01)
  *F01N 3/08* (2006.01)
  *F01N 3/24* (2006.01)
  *F01N 3/28* (2006.01)

(52) U.S. Cl.
  CPC ...... *B01D 46/2418* (2013.01); *B01D 46/2429* (2013.01); *B01D 46/24491* (2021.08); *B01D 46/24492* (2021.08); *B01D 53/9454* (2013.01); *B01D 53/9459* (2013.01); *B01D 53/9468* (2013.01); *B01D 2239/1208* (2013.01); *B01D 2255/1023* (2013.01); *B01D 2255/1025* (2013.01); *B01D 2255/2042* (2013.01); *B01D 2255/2065* (2013.01); *B01D 2255/915* (2013.01); *B01D 2255/9155* (2013.01); *B01J 20/3231* (2013.01); *B01J 23/63* (2013.01); *B01J 35/56* (2024.01); *F01N 3/0222* (2013.01); *F01N 3/0821* (2013.01); *F01N 3/24* (2013.01); *F01N 3/28* (2013.01); *F01N 2330/06* (2013.01); *F01N 2510/068* (2013.01); *F01N 2510/0682* (2013.01); *F01N 2510/0684* (2013.01)

(56) References Cited

U.S. PATENT DOCUMENTS

| | | | |
|---|---|---|---|
| 2011/0252773 | A1 | 10/2011 | Arnold et al. |
| 2012/0230881 | A1* | 9/2012 | Boger ................ F01N 3/0821 |
| | | | 422/187 |
| 2014/0356266 | A1* | 12/2014 | Chen ................ F01N 3/0222 |
| | | | 423/212 |
| 2015/0017075 | A1 | 1/2015 | Jinbo et al. |
| 2020/0370453 | A1* | 11/2020 | Gunasekaran ........ F01N 3/2066 |
| 2021/0023543 | A1* | 1/2021 | Clowes ................ B01J 35/393 |
| 2021/0094018 | A1* | 4/2021 | Nakashima ........... B01J 37/082 |
| 2021/0381413 | A1 | 12/2021 | Onoe et al. |
| 2021/0387145 | A1* | 12/2021 | Maurer ................ B01J 35/638 |
| 2023/0321635 | A1* | 10/2023 | Li .......................... B01J 21/04 |

FOREIGN PATENT DOCUMENTS

| | | |
|---|---|---|
| JP | 2004105792 A | 4/2004 |
| JP | 2005-262144 A | 9/2005 |
| JP | 2010110750 A | 5/2010 |
| JP | 201317992 A | 1/2013 |
| JP | 2013-141628 A | 7/2013 |
| JP | 201931974 A | 2/2019 |
| JP | 202054978 A | 4/2020 |
| JP | 2020081912 A | 6/2020 |
| WO | 2013/145316 A1 | 10/2013 |

OTHER PUBLICATIONS

International Search Report issued in International Application No. PCT/JP2021/045310 dated Feb. 15, 2022.

* cited by examiner

PARTICULATE FILTER

CROSS REFERENCE TO RELATED APPLICATIONS

This application is a national phase under 35 USC 371 of International Application No. PCT/JP2021/045310, filed Dec. 9, 2021, which claims the benefit of the filing date of Japanese Application No. 2021-104292, filed Jun. 23, 2021, the contents of all of which are hereby incorporated by reference in their entireties.

TECHNICAL FIELD

The present invention relates to a particulate filter. The present invention specifically relates to a particulate filter that capture a particulate matter (PM) contained in exhaust gas exhausted from internal combustion engines.

The present application is based upon and claims the benefit of priority from Japanese patent application No. 2021-104292 filed on Jun. 23, 2021, and the entire disclosure of which is incorporated herein its entirety by reference.

BACKGROUND ART

The exhaust gas exhausted from the internal combustion engine such as an automobile engine contains a particulate matter (PM) in addition to hazardous gas components such as hydrocarbon (HC), carbon monoxide (CO), and nitrogen oxide ($NO_x$). There are concerns about the influence of PM on the human body as well as the influence of the hazardous gas components. Thus, a particulate filter for capturing PM in the exhaust gas is disposed in an exhaust system of the internal combustion engine.

Such a particulate filter includes, for example, a wall-flow type base material. The wall-flow type base material includes: inlet cells each with an opening only at an exhaust gas inlet end; outlet cells each with an opening only at an exhaust gas outlet end, and a porous partition partitioning both cells. Exhaust gas supplied to the wall-flow type base material flows into the inlet cells, passes through the partition, and then exhausted from the outlet cells. At this time, PM in the exhaust gas is captured inside the porous partition.

In this kind of particulate filter, a coat layer may be formed on the partition of the base material in order to improve the PM capturing performance. For example, in the particulate filter described in Patent Literature 1, a wash-coat layer may be provided inside the partition (the wall surfaces of pores in the partition) to control the pore diameter of the partition. This allows for obtaining of the particulate filter that can stably capture PM regardless of driving conditions. Further, as described in Patent Literature 1, a technology of imparting a purification function for hazardous gas components to the particulate filter by adding a noble metal catalyst (typically, a three-way catalyst) to the coat layer has been proposed in recent years.

CITATION LIST

Patent Literature

Patent Literature 1: Japanese Patent Application Publication No. 2020-81912

SUMMARY OF INVENTION

Technical Problem

In recent years, in response to the increasing environmental concerns, there has been a demand for the development of the particulate filter that can exhibit a more excellent PM capturing performance than before. The present inventors focused on the PM passing through the pores in the partition in order to meet such a demand. Specifically, when large pores are formed in the partition of the wall-flow type base material, or when exhaust gas contains PM having a small particle diameter, PM flows out to the outlet cells without being captured inside the partition. The "PM passing through" causes a decline the PM capturing performance.

The present invention was made in view of the circumstances described above, and the objective thereof is to provide a particulate filter that can appropriately avoid PM from passing toward the outlet cells and exhibit an excellent PM capturing performance.

Solution to Problem

In order to achieve the objective, the present invention provides a particulate filter with the following configuration. The particulate filter disclosed herein is disposed in an exhaust system of an internal combustion engine and used to capture a particulate matter in exhaust gas exhausted from the internal combustion engine. The particulate filter includes: a wall-flow type base material having an inlet cell with an opening only at an exhaust gas inlet end, an outlet cell with an opening only at an exhaust gas outlet end, and a porous partition partitioning the inlet cell and the outlet cell; an outercoat layer that is a porous layer including multiple granules and is provided on a surface of the partition in contact with the inlet cell. The outercoat layer of the particulate filter disclosed herein at least includes a lower layer provided on the surface of the partition in contact with the inlet cell and an upper layer provided to cover the lower layer. A mean particle diameter of the granules in the upper layer is larger than a mean particle diameter of the granules in the lower layer. The mean particle diameter of the granules in the lower layer is from 0.4 µm to 2.0 µm inclusive, and the mean particle diameter of the granules in the upper layer is from 2.0 µm to 7.0 µm inclusive.

As a result of various studies, the present inventors have considered that PM may pass through when the PM is captured inside the partition such as in conventional art, and conceived of the idea of capturing the PM outside the partition (typically, the inlet cell). The particulate filter disclosed herein is made based on such conception. In the particulate filter, a porous outercoat layer is provided on the surface (inlet surface) in contact with the inlet cell of the partition. By covering the inlets of pores of the partition with the outercoat layer, PM can be captured outside the partition. As a result, the PM passing through can be avoided. Furthermore, the particulate filter disclosed herein can avoid PM from depositing inside the partition. In other words, the particulate filter disclosed herein can also contribute to suppression of a rapid increase in pressure drop due to blocking of pores.

As will be described in detail later, it is difficult to form an outercoat layer that can appropriately cover the inlet surface of the partition (especially, the inlets of the pores). In contrast, in the technology disclosed herein, an outercoat layer having a multilayer structure including an upper layer and a lower layer is formed, and a particle diameter of granules in each layer is controlled to satisfy the predetermined condition. This allows for achievement of the outercoat layer appropriately covering inlets of the pores. The outercoat layer can avoid the PM passing through.

In a preferred aspect of the particulate filter disclosed herein, the granules contain at least one selected from the group consisting of alumina, ceria, zirconia, silica, magnesia, and calcia. This allows for formation of the outercoat layer with excellent heat resistance.

In a preferred aspect of the particulate filter disclosed herein, the granules contain a noble metal catalyst for purifying a hazardous gas component in the exhaust gas. This allows for obtaining of the particulate filter with a purification function for a hazardous gas component. As described in detail below, the technology disclosed herein also has an effect of improving the purification function for hazardous gas components by the noble metal catalyst.

In a preferred aspect of the particulate filter disclosed herein, a coating amount of the lower layer is higher than a coating amount of the upper layer. Accordingly, a particulate filter with an excellent pressure drop suppression function can be obtained.

In a preferred aspect of the particulate filter disclosed herein, the coating amount of the lower layer per 1 L of the base material is from 30 g/L to 50 g/L inclusive. This allows for obtaining of a particulate filter having an excellent pressure drop suppression function.

In a preferred aspect of the particulate filter disclosed herein, the coating amount of the upper layer per 1 L of the base material is from 10 g/L to 30 g/L inclusive. This allows for obtaining of a particulate filter having a PM capturing performance and a pressure drop suppression function at high level.

In a preferred aspect of the particulate filter disclosed herein, a porosity of the lower layer is higher than a porosity of the upper layer. This allows for obtaining of a particulate filter having a more excellent PM capturing performance.

In a preferred aspect of the particulate filter disclosed herein, the porosity of the lower layer is from 24% to 57% inclusive. This allows for obtaining of a particulate filter having a PM capturing performance and a pressure drop suppression function at high level.

In a preferred aspect of the particulate filter disclosed herein, the porosity of the upper layer is from 21% to 38% inclusive. This allows for obtaining of a particulate filter having a PM capturing performance and a pressure drop suppression function at high level.

In a preferred aspect of the particulate filter disclosed herein, an average pore diameter of the partition is from 5 μm to 50 μm inclusive. With the technology disclosed herein, even in the base material having the partition with such large pores, the outercoat layer appropriately covering the surface of the partition can be formed.

In a preferred aspect of the particulate filter disclosed herein, the porosity of the partition is 30% to 90%. With the technology disclosed herein, even in the base material having the partition with many large pores, the outercoat layer appropriately covering the surface of the partition can be formed.

A preferred aspect of the particulate filter disclosed herein further includes: an inner coat layer that is provided on wall surfaces of pores in a predetermined area extending from a surface of the partition in contact with the outlet cell to the inlet cell and that contains a noble metal catalyst for purifying the hazardous gas component in the exhaust gas. With such a configuration, exhaust gas from which PM has been removed by the outercoat layer can be supplied to the inner coat layer containing the noble metal catalyst. This can avoid deterioration of the activity of the noble metal catalyst due to adhesion of (coating with) PM. As a result, the particulate filter can obtain an excellent purifying performance against hazardous gas components.

In an aspect in which the inner coat layer is provided, an uncoated area in which a coat layer is substantially not present is preferably provided between the outercoat layer and the inner coat layer in a thickness direction of the partition. This allows fine PM which has passed through the outercoat layer to be deposited in an area in which the pores have been narrowed by the inner coat layer, thereby avoiding PM from blocking pores.

In an aspect in which the uncoated area is provided, a dimension of the uncoated area in the thickness direction of the partition is preferably from 10 μm to 100 μm inclusive. This suitably avoids PM from adhering to the inner coat layer while ensuring an area for forming the inner coat layer.

In a preferred aspect of the particulate filter disclosed herein, the internal combustion engine is a gasoline engine. Exhaust gas generated in the gasoline engine has a higher temperature than exhaust gas exhausted from other engines (such as a diesel engine) and thus can easily combust PM captured outside the partition (inlet cell). In light of this fact, the particulate filter disclosed herein can be particularly suitably used as a gasoline particulate filter (GPF).

DESCRIPTION OF EMBODIMENTS

Some preferred embodiments of the present invention will be described below with reference to the accompanying drawings. The matters necessary for executing the present invention (e.g., general matters related to arrangement of the particulate filter in the exhaust path), except for matters specifically herein referred to can be grasped as design matters of those skilled in the art based on the related art in the preset field. The present invention can be executed based on the contents disclosed herein and the technical knowledge in the present field. The expression "A to B" indicating herein a numerical range means "A or more and B or less."

[Exhaust System of Internal Combustion Engine]

Figure 1:
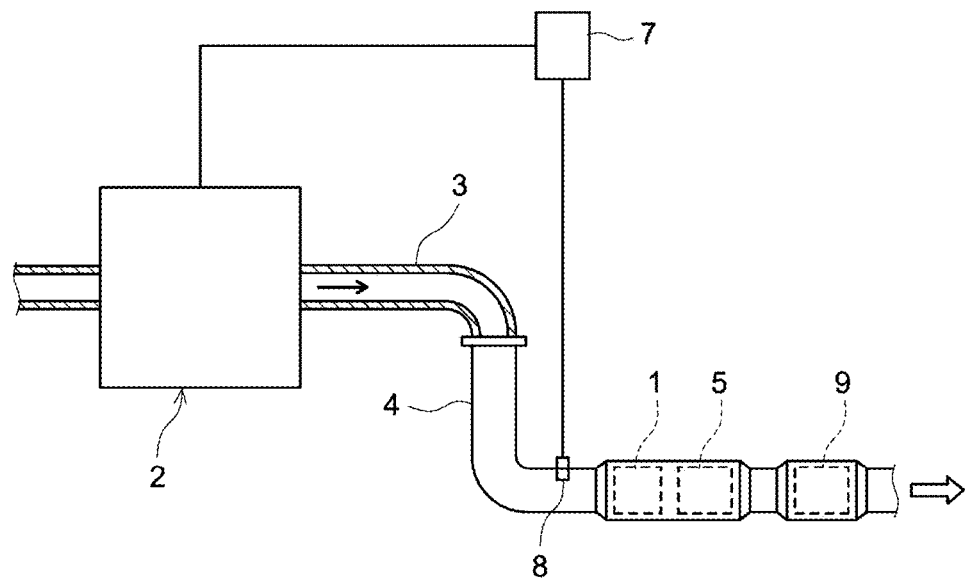
FIG. 1 schematically illustrates an exhaust system in which a particulate filter is disposed.

Applications of the particulate filter disclosed herein will be described below. FIG. 1 schematically illustrates an exhaust system in which a particulate filter is disposed.

The reference sign 2 in FIG. 1 indicates an internal combustion engine. To the internal combustion engine 2, an air-fuel mixture containing oxygen and fuel gas is supplied. The internal combustion engine 2 combusts the air-fuel mixture to generate kinetic energy. The exhaust gas produced by the combustion of the air-fuel mixture is then discharged into the exhaust system including an exhaust manifold 3 and an exhaust pipe 4, as shown by the arrow in FIG. 1. In this specification, for convenience of explanation, a side near the internal combustion engine 2 in a direction in which the exhaust gas flows is referred to as an upstream side, and a side farther from the internal combustion engine 2 is referred to as a downstream side.

The exhaust pipe 4 is equipped with a sensor 8 for detecting information about components and temperatures of the exhaust gas. The sensor 8 is connected to an engine control unit (ECU) 7. Information detected by the sensor 8 is sent to the ECU 7, and used as a piece of information for correcting operation control of the internal combustion engine 2.

In the exhaust system (exhaust pipe 4) of the internal combustion engine 2, a particulate filter 1, an exhaust gas purification catalyst 5, and an underfloor catalyst 9 are disposed. The particulate filter 1 captures a particulate matter (PM) in the exhaust gas. The specific configuration of the particulate filter 1 will be described later. The exhaust gas from which PM has been removed by the particulate filter 1 passes through the exhaust gas purification catalyst 5 and the underfloor catalyst 9 and is then exhausted to the outside of the exhaust system. The exhaust gas purification catalyst 5 and the underfloor catalyst 9 are each a member containing a catalyst body for purifying hazardous gas components ($NO_x$, HC, and CO) in the exhaust gas. Specific configurations of the exhaust gas purification catalyst 5 and the underfloor catalyst 9 are not features of the technology disclosed herein, and thus, detailed description thereof is omitted. In the exhaust system shown in FIG. 1, the exhaust gas purification catalyst 5 is disposed downstream of the particulate filter 1, but the location thereof is not particularly limited thereto. For example, the particulate filter may be disposed upstream of the exhaust gas purification catalyst. The particulate filter disclosed herein may be disposed at the location of the underfloor catalyst.

First Embodiment

Figure 2:
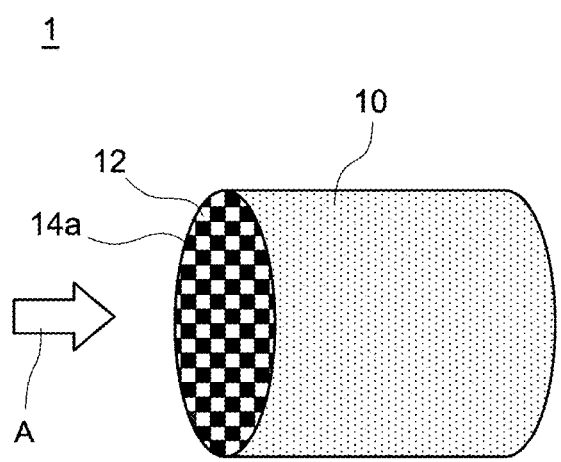
FIG. 2 is a schematic perspective view of a particulate filter according to a first embodiment.
Figure 3:
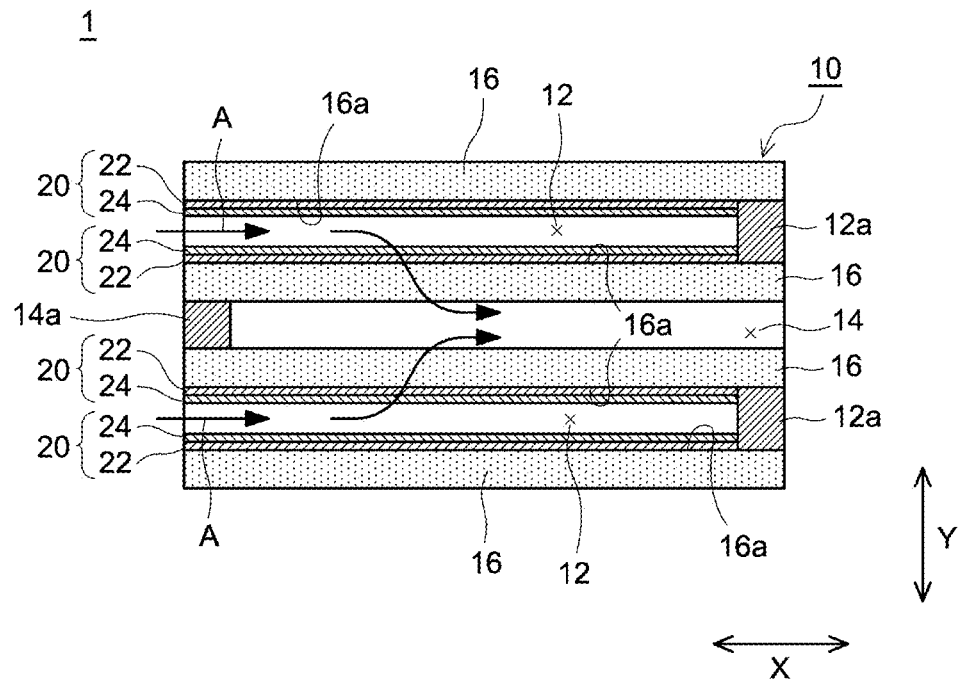
FIG. 3 is a schematic sectional view of the particulate filter according to the first embodiment along a cylinder axis direction.
Figure 4:
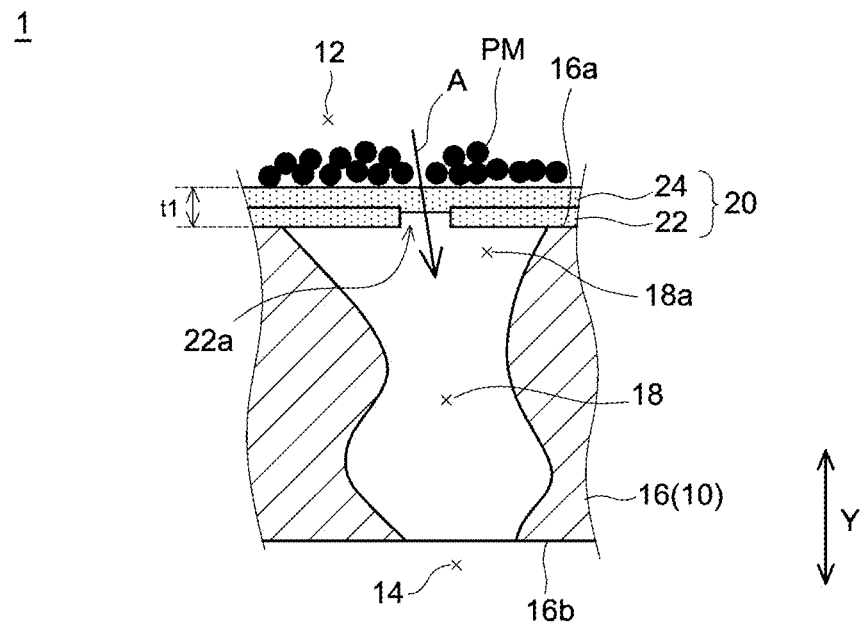
FIG. 4 is a schematic enlarged sectional view of a partition of the particulate filter according to the first embodiment.

A first embodiment of the particulate filter disclosed herein will be described below. FIG. 2 is a schematic perspective view of the particulate filter according to a first embodiment. FIG. 3 is a schematic sectional view of the particulate filter according to the second embodiment along a cylinder axis direction. FIG. 4 is a schematic enlarged sectional view of a partition of the particulate filter according to the first embodiment. The reference sign A in each drawing referred to herein indicates the "direction in which exhaust gas flows." The reference sign X indicates the "direction in which the partition extends," and the reference sign Y indicates the "thickness direction of the partition of the base material."

As shown in FIGS. 2 to 4, the particulate filter 1 according to the present embodiment includes a base material 10 and an outercoat layer 20. Each component will be described below.

1. Base Material

The base material 10 constitutes the framework of the particulate filter 1. As shown in FIG. 2, in the present embodiment, a cylindrical base material 10 extending along the direction A in which the exhaust gas flows is used. The outside shape of the base material is not limited to cylindrical, and may be elliptic cylindrical, polygonal, or the like. The overall length and capacity of the base material 10 are also not particularly limited, and can be changed, as appropriate, according to the performance of the internal combustion engine 2 (see FIG. 1), dimensions of the exhaust pipe 4, and the like. In the base material 10 according to the present embodiment, known materials that can be used in base materials of particulate filters can be used without particular limitations. Examples of the materials of the base material 10 include highly heat resistance materials, namely ceramics such as cordierite, silicon carbide (SiC), and aluminum titanate and alloys such as stainless steel. For example, cordierite has excellent durability against thermal shock, and thus can be particularly suitably used as a material of the base material of the gasoline particulate filter (GPF) to which high-temperature exhaust gas is prone to be supplied.

The base material 10 is a wall-flow type base material. Specifically, as shown in FIGS. 2 and 3, the base material 10 includes: inlet cells 12 that are open only at an exhaust gas inlet end; outlet cells 14 that are open only at an exhaust gas outlet end; and porous partitions 16 partitioning the inlet cells 12 and the outlet cells 14. Specifically, the inlet cells 12 are each a gas flow path which is open at the exhaust gas inlet end and has an exhaust gas outlet end closed with a sealing portion 12a. The outlet cells 14 are each a gas flow path which has an exhaust gas outlet end closed with a sealing portion 14a and is open at the exhaust gas outlet end. In the base material 10, the inlet cells 12 and the outlet cells 14 are provided next to each other in an alternating manner. The partitions 16 partitioning the inlet cells 12 and the outlet cells 14 each have multiple pores 18 (see FIG. 4) through which the inlet cells 12 and the outlet cells 14 communicate with each other. In FIG. 2, the shape of each of the inlet cells 12 and the outlet cells 14 in the section perpendicular to the direction X in which the partitions 16 extend (typically, the cross section along the radial direction) is an approximately square. However, the sectional shape of each cell is not particularly limited, and various geometric shapes such as a parallelogram, a rectangle, and a trapezoid, other polygonal shapes (e.g., a hexagon, an octagon), and circular shapes can be employed. The thickness of the partition 16 is preferably about 0.05 mm to about 2 mm, more preferably about 0.1 mm to about 1 mm.

The pore diameter of the pores 18 and the porosity of the partition 16 may affect the PM capturing performance and the pressure drop suppression function of the particulate filter 1. Specifically, the average pore diameter of the pores 18 is preferably 5 μm or more, more preferably 10 μm or more, particularly preferably 15 μm or more. The porosity of the partition 16 is preferably 30% or more, more preferably 40% or more, particularly preferably 50% or more. The partition 16 having many relatively large pores 18 has excellent air permeability and thus can appropriately suppress an increase in pressure drop. However, it is difficult to form the outercoat layer 20 on the inlet surface 16a of the partition 16 in the base material 10 having many large pores 18. In the technology disclosed herein, the particle diameter of granules used to form the outercoat layer 20 is appropriately controlled. Thus, even in the base material 10 having many large pores 18, an outercoat layer 20 appropriately covering the inlet surface 16a of the partition 16 can be formed. The "average pore diameter of the pores in the partition" and the "porosity of the partition" herein are values measured by mercury porosimetry.

The upper limit of the average pore diameter of the pores 18 is preferably 50 μm or less, more preferably 40 μm or less, particularly preferably 30 μm or less. The upper limit of the porosity of the partition 16 is preferably 90% or less, more preferably 80% or less, yet more preferably 70% or less, particularly preferably 65% or less. Accordingly, the base material 10 having excellent strength can be obtained. As the average pore diameter and porosity of the partition 16 decrease, it tends to be easier to form the outercoat layer 20 on the inlet surface 16a of the partition 16.

2. Outercoat Layer (1) Overall Structure of Outercoat Layer

As shown in FIGS. 3 and 4, in the particulate filter 1 according to the present embodiment, the outercoat layer 20 is provided on the surface (inlet surface 16a) of the partition 16 of the base material 10 in contact with the inlet cell 12. The outercoat layer 20 is a porous layer having aggregated predetermined granules. The granules in the outercoat layer 20 preferably contain, as a main component, a heat resistant material defined in JIS R 2001. Examples of the heat resistant material include alumina ($Al_2O_3$), ceria ($CeO_2$), zirconia ($ZrO_2$), silica ($SiO_2$), magnesia (MgO), and calcia (CaO). Among the heat resistant materials, alumina, ceria, and zirconia are more preferable. "Containing as a main component" means containing the heat resistant material in 50 mass % or more (suitably 60 mass % or more, more suitably 70 mass % or more, particularly preferably 80 mass %) relative to the total weight of the outercoat layer 20. This can avoid loss of air permeability due to sintering of the outercoat layer 20.

The outercoat layer 20 includes: a lower layer 22 provided on the inlet surface 16a of the partition 16; and an upper layer 24 provided to cover the lower layer 22. In the present embodiment, the mean particle diameter of the granules in each of the lower layer 22 and upper layer 24 is controlled to satisfy the predetermined conditions. This allows inlets 18a of the pores 18 to be covered with the outercoat layer 20. Thus, PM can be captured outside the partitions 16 (the inner cells 12), and PM can be avoided from entering inside the pores 18. Accordingly, the particulate filter 1 according to the present embodiment can appropriately avoid PM from passing toward the outlet cells 14, and an excellent PM capturing performance can be exhibited. The controlling of the mean particle diameter of granules in each layer will be described in detail later. The granules contained in the lower layer 22 and the granules contained in the upper layer 24 may be made of the same material or different materials.

The granules of the outercoat layer 20 may contain a noble metal catalyst. This allows for obtaining of the particulate filter 1 with a purification function for hazardous gas components (HC, CO, $NO_x$) in the exhaust gas. The noble metal catalyst promotes combustion of PM captured in the outercoat layer 20, which can contribute to improvement in the pressure drop suppression function. The kind of the noble metal catalyst is not particularly limited, and known materials can be used without particular limitations. Specific examples of the noble metal catalyst include gold (Au), silver (Ag), palladium (Pd), platinum (Pt), rhodium (Rh), and ruthenium (Ru). These noble metal catalysts oxidize CO and HC in the exhaust gas and function as three-way catalysts that reduce $NO_x$, and thus can purify hazardous gas components more efficiently. The noble metal catalyst may be added to both of the lower layer 22 and the upper layer 24, or only one of them.

As will be described in detail later, in the particulate filter 1 according to the present embodiment, the lower limit of the mean particle diameter of granules in the lower layer 22 is controlled to be 0.4 μm or more in order to form an appropriate outercoat layer 20 on the inlet surface 16a of the partition 16. According to experiments conducted by the present inventors, it has been confirmed that when a noble metal catalyst is added to the lower layer 22, the purifying performance for hazardous gas components is greatly improved in addition to the effect of forming an appropriate outercoat layer 20. In other words, the technology disclosed herein can exhibit a particularly suitable effect on particulate filters (i.e., filter catalysts) in which the coat layer is catalyzed with the noble metal catalyst. The reason for this effect is assumed to be that the reduction in catalytic activity due to sintering of the noble metal catalyst can be suppressed.

When the noble metal catalyst is added to the outercoat layer 20, an additive that enhances catalytic activity of the noble metal catalyst is preferably added together. The additive can be, for example, an OSC material. The OSC material refers to a material that has an oxygen storage capacity (OSC) and occludes and releases oxygen. The addition of the OSC material makes it easier to maintain the exhaust gas atmosphere in contact with the outercoat layer 20 near stoichiometric (theoretical air-to-fuel ratio), thus stabilizing the catalytic action of the noble metal catalyst. The OSC material can be, for example, a ceria-zirconia composite oxide. As the additive other than the OSC material, a $NO_x$ adsorbent having a NOx storage capacity, a stabilizing agent, and the like may be added. The outercoat layer 20 may further contain trace amounts of components derived from raw materials and manufacturing processes. For example, the outercoat layer 20 may contain one or more of compounds (such as oxides, sulfates, carbonates, nitrates, and chlorides) including any one of alkali earth metals (such as Be, Mg, Ca, and Ba), rare-earth metals (such as Y, La, and Ce), alkali metals (such as Li, Na, and K), and transition metals (such as Mn, Fe, Co, and Ni).

(2) Structures of Upper Layer and Lower Layer

As mentioned above, in the particulate filter 1 according to the present embodiment, an outercoat layer 20 having a multilayer structure including a lower layer 22 and an upper layer 24 is formed, and the mean particle diameter of each layer is controlled to be in the predetermined range. Specifically, in the present embodiment, the mean particle diameter of granules in the upper layer 24 is higher than the mean particle diameter of granules in the lower layer 22, and the mean particle diameter of the granules in the lower layer 22 is controlled to be from 0.4 μm to 2.0 μm inclusive, and the mean particle diameter of the granules in the upper layer 24 is controlled to be from 2.0 μm to 7.0 μm inclusive. This allows the outercoat layer 20 to be formed on the inlet surfaces 16a of the partitions 16 to appropriately cover the inlets 18a of the pores 18, thereby avoiding PM from passing toward the outlet cells 14. The structures of the lower layer 22 and the upper layer 24 in the outercoat layer 20 will be described below, comparing them to coat layer of a conventional particulate filter.

Figure 9:
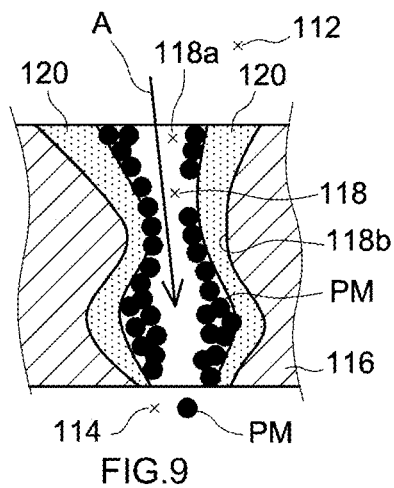
FIG. 9 is a schematic enlarged sectional view of a partition of a conventional particulate filter.
Figure 10:
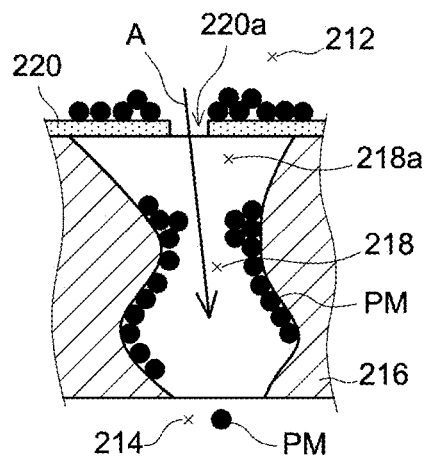
FIG. 10 is a schematic enlarged sectional view of a partition of a particulate filter produced in processes to reach the technology disclosed herein.
Figure 11:
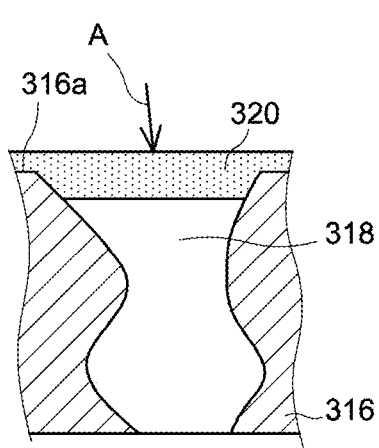
FIG. 11 is another schematic enlarged sectional view of the partition of the particulate filter produced in the processes to reach the technology disclosed herein.

First, the conventional particulate filter and a particulate filter produced in processes to reach the technology disclosed herein will be described. FIG. 9 is a schematic enlarged sectional view of a partition of a base material in the conventional particulate filter. FIGS. 10 and 11 are schematic enlarged sectional views of the partition of the base material of the particulate filter produced in the processes to reach the technology disclosed herein.

As shown in FIG. 9, in the conventional particulate filter 100, a coat layer 120 is formed inside the partition 116 of the base material (specifically, on the wall surfaces 118b of pores 118). This narrows the pores 118 and reduces PM passing toward the outlet cells 114. However, the particulate filter 100 with such a structure does not sufficiently avoid PM from passing through. PM may pass toward the outlet cells 114 via the pores 118 when the pore diameters of the pores 118 are large, or the particle diameter of PM is small. As a result of various studies, the present inventors have considered that, in order to appropriately avoid this kind of PM from passing through, the inlets 118a of the pores 118 are covered with a porous coat layer, and PM is captured in the inlet cells 112, thereby avoiding PM from entering the partition 116 itself.

However, in the actual manufacturing of the particulate filter, it has been difficult to form an outercoat layer that can appropriately cover the inlets of the pores in the partition. Specifically, when a coat layer is formed on the partition of the base material, a precursor (raw material slurry) of the coat layer is injected into the inlet cells, and then the outlet cells are sucked to supply the raw material slurry to the inside of the base material. By adjusting the suction force and the like at this time, the outercoat layer 220 is formed on the inlet surface of the partition 216 as in a particulate filter 200 shown in FIG. 10. The outercoat layer 220 can capture a part of PM, within the inlet cell 212. However, if granules contained in the raw material slurry are small, some of the raw material slurry may pass through the pores 218 in the partition 216, and the openings 220a may be formed in the outercoat layer 220. In such an outercoat layer 220, the inlets 218a of the pores 218 cannot be appropriately covered, and PM enters the inside of the partition 216 through the openings 220a. Thus, it is difficult to sufficiently avoid the PM from passing toward the outlet cells 214.

In contrast, when granules contained in the raw material slurry are large, the raw material slurry can be avoided from passing through the pores of the partition. Thus, as in a particulate filter 300 shown in FIG. 11, the coat layer 320 having no opening can be formed. However, if such large granules are used, a large amount of the coat layer 320 may enter the inside of the pores 318 from the inlet surface 316a of the partition 316. In this case, the pores 318 may be blocked by the large amount of the coat layer 320. In such a case, PM can be avoided from passing through, but the pressure drop may increase to a level at which it is difficult to use the particulate filter.

In contrast, the outercoat layer 20 according to the present embodiment has a multilayer structure including a lower layer 22 formed of granules having a small particle diameter and an upper layer 24 formed of granules having a large particle diameter (see FIG. 4). In formation of the outercoat layer 20 having such a multilayer structure, first, a lower layer slurry containing granules having a small particle diameter is used to form the lower layer 22. In formation of the lower layer 22, part of the lower layer slurry passes through the pores 18. As a result, openings 22a are formed in the lower layer 22 after the formation, as in the particulate filter 200 shown in FIG. 10. However, in this embodiment, after the formation of the lower layer 22, an upper layer 24 is formed using an upper layer slurry containing granules having a larger particle diameter. This allows the upper layer 24 to be formed to block the openings 22a in the lower layer 22, so that the outercoat layer 20 appropriately covering the inlets 18a of the pores 18 can be formed. Further, in the present embodiment, the lower layer 22 is formed in advance. Thus, unlike the particulate filter 300 shown in FIG. 11, the pores 18 can be avoided from being blocked by the upper layer slurry.

As can be seen from above, since in the particulate filter 1 according to the present embodiment, the outercoat layer 20 having a multilayer structure including a lower layer 22 and an upper layer 24 covers inlets 18a of the pores 18, PM can be avoided from entering the inside of the partition 16. This allows PM to pass toward the outlet cell 14, and a high PM capturing performance to be exhibited. In the particulate filter 1 according to the present embodiment, PM is captured in the inlet cells 12. The inlet cells 12 each have a larger volumetric capacity than pores 18 in the partition 16, so that the yare less likely to be blocked even if PM is deposited. Thus, the particulate filter 1 according to the present embodiment can also contribute to suppression of pressure drop increase by deposition of PM.

According to the studies by the present inventors, merely defining the relative particle diameter of the granules in each of the lower layer 22 and the upper layer 24 may not be enough to form an outercoat layer 20 appropriately covering the inlets 18a of the pores 18. For example, if the granules in the lower layer 22 are too small, most of the lower layer slurry supplied to the inlet cells 12 may permeate into the pores 18. In such a case, a lower layer 22 covering part of the inlets 18a of the pores 18 is not formed, and a coat layer (see coat layer 120 in FIG. 9) adhered to the wall surfaces 18b of the pores 18 may be formed. In light of this fact, the mean particle diameter of the granules in the lower layer 22 needs to be controlled to 0.4 µm or higher. As the granules in the lower layer 22 become larger, the inlets 18a of the pores 18 are more easily coated with the lower layer 22, and the openings 22a of the lower layer 22 tend to become smaller. In light of this fact, the mean particle diameter of the granules in the lower layer 22 is preferably 0.45 µm or more, particularly preferably 0.5 µm or more. If the granules in the lower layer 22 become too large, the coat layer that blocks the pores 18 may be formed (see the coat layer 320 in FIG. 11). Thus, the mean particle diameter of the granules in the lower layer 22 needs to be controlled to 2.0 µm or lower. In light of suitably avoiding the pores 18 from being blocked by the coat layer, the upper limit of the mean particle diameter of the granules in the lower layer 22 is preferably 1.75 µm or less, particularly preferably 1.5 µm or less.

If the granules in the upper layer 24 are too small, the upper layer slurry may pass through the openings 22a in the lower layer 22. In such a case, the coat layer made of granules having a larger particle diameter may be formed inside the partition 16, and the pores 18 may be blocked. Thus, the mean particle diameter of the granules in the upper layer 24 needs to be controlled to 2.0 µm or more. In light of more appropriately avoiding the upper layer slurry from flowing into the pores 18, the mean particle diameter of the granules in the upper layer 24 is preferably 2.5 µm or more, more preferably 3.0 µm or more, particularly preferably 3.5 µm or more. If the granules in the upper layer 24 are too large, the contact area at the interface between the lower layer 22 and the upper layer 24 may decrease, which may cause peeing of the upper layer 24. Thus, the mean particle diameter of the granules in the upper layer 24 needs to be controlled to 7.0 µm or less. In light of appropriately avoiding the upper layer 24 from being peeled off, the upper limit of the mean particle diameter of the granules in the upper layer 24 is preferably 6.5 µm or less, more preferably 6 µm or less, yet more preferably 5.5 µm or less, particularly preferably 5 µm or less.

The "mean particle diameter" herein is a cumulative 50% particle diameter (D50) in a number-based particle size distribution based on electron microscopy. Specifically, in measurement of the "mean particle diameter," first, the SEM image of the outercoat layer (the upper layer, the lower layer) is subjected to image analysis, equivalent circle diameters of ten of the particles forming each layer are measured, and a number-based particle size distribution is created. Then, in the particle size distribution, the particle diameter at the cumulative 50% from the smallest particle diameter is regarded as the "mean particle diameter D50." The mean particle diameter herein is calculated to encompass the particle diameter of secondary particles formed by aggregation or sintering. In other words, when the mean particle diameter is calculated, the equivalent circle diameters of particles observed by the electron microscopy are measured without distinguishing between primary particles and secondary particles, and the mean particle diameter is measured based on the equivalent circle diameters of the particles measured.

For the location at which the lower layer 22 is formed, it is described herein that the lower layer 22 is "formed on the surface (inlet surface 16a) of the partition 16 in contact with the inlet cell 12." "Being formed on the inlet surface 16a" herein means that most of the lower layer 22 is adhered to the inlet surface 16a of the partition 16. That is, the term, "Being formed on the inlet surface 16a", does not prohibit portion of the lower layer 22 from entering the inside of the partition 16. Typically, in analysis based on the SEM image to be described later, when 20% or more (suitable 30% or more, more suitably 40% or more) of the lower layer 22 is adhered to the inlet surface 16a of the partition 16, it can be said that "the lower layer 22 is formed on the inlet surface 16a of the partition 16."

Although the technology disclosed herein is not limited thereto, the thickness t1 of the outercoat layer 20 is preferably 3 μm or more, more preferably 5 μm or more, particularly preferably 10 μm or more. This allows the PM capturing performance in the outercoat layer 20 to be sufficiently secured, and PM to be suitably avoided from entering inside the pores 18. On the other hand, if the thickness t1 of the outercoat layer 20 is too large, the inlet cells 12 become narrower, which may cause an increase in pressure drop. In light of this fact, the thickness t1 of the outercoat layer 20 is preferably 50 μm or less, more preferably 40 μm or less, particularly preferably 30 μm or less.

The porosity of the lower layer 22 is preferably larger than the porosity of the upper layer 24. This allows a particulate filter having an excellent PM capturing performance to be obtained. While not intended to limit the technology disclosed herein, the reasons for such an effect may be considered as follows. PM passing through the outercoat layer 20 can be reduced by covering the lower layer 22 with the upper layer 24 having a relatively low porosity. The specific porosity of the lower layer 22 is preferably 20% or more, more preferably 24% or more, yet more preferably 30% or more, particularly preferably 35% or more. This allows a certain level of air permeability of the outercoat layer 20 to be ensured and a rapid increase in pressure drop to be avoided. The upper limit of the porosity of the lower layer 22 is preferably 65% or less, more preferably 60% or less, particularly preferably 57% or less. This allows for more suitable PM capturing performance. The specific porosity of the upper layer 24 is preferably 15% or more, more preferably 20% or more, particularly preferably 24% or more. This allows a certain level of air permeability of the outercoat layer 20 to be ensured and a rapid increase in pressure drop to be avoided. The upper limit of the porosity of the upper layer 24 is preferably 60% or less, more preferably 50% or less, particularly preferably 40% or less. This allows for more suitable PM capturing performance. As will be described in detail below, the "porosity of the outercoat layer (the upper layer, the lower layer)" can be measured by subjecting the sectional SEM image to predetermined image analysis.

The coating amount of the lower layer 22 is preferably larger than the coating amount of the upper layer 24. This allows a particulate filter having an excellent pressure drop suppression function to be obtained. While not intended to limit the technology disclosed herein, the reasons for such an effect may be considered as follows. The upper layer slurry can be avoided from entering inside the pores 18 of the partition 16 by forming the lower layer 22 with a sufficient coating amount. The specific coating amount of the lower layer 22 is preferably 30 g/L or more, more preferably 35 g/L or more, particularly preferably 40 g/L or more. This allows the upper layer slurry to be avoided from entering inside the pores 18 of the partition 16. The upper limit of the coating amount of the lower layer 22 is not particularly limited as long as the coating amount is not so excessive as to block the inlet cells 12. For example, the upper limit of the coating amount of the lower layer 22 may be 60 g/L or less, 55 g/L or less, or 50 g/L or less. The specific coating amount of the upper layer 24 is preferably 1 g/L or more, more preferably 5 g/L or more, particularly preferably 10 g/L or more. This allows the openings 22a in the lower layer 22 to be appropriately covered, thereby exhibiting a suitable PM capturing performance. The upper limit of the coating amount of the upper layer 24 is preferably 50 g/L or less, more preferably 40 g/L or less, particularly preferably 30 g/L or less. This allows the upper layer slurry to be avoided from entering inside the pores 18 of the partition 16. The "coating amount (g/L)" herein indicates the weight (g) of the coating amount relative to the volume (L) of the base material.

Second Embodiment

Figure 5:
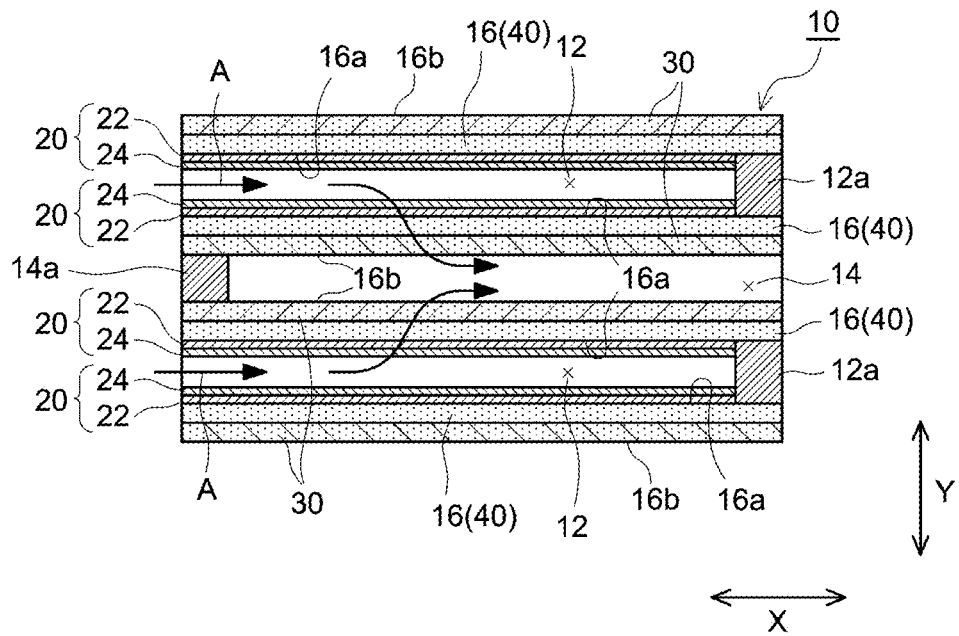
FIG. 5 is a schematic sectional view of a particulate filter according to a second embodiment along a cylinder axis direction.
Figure 6:
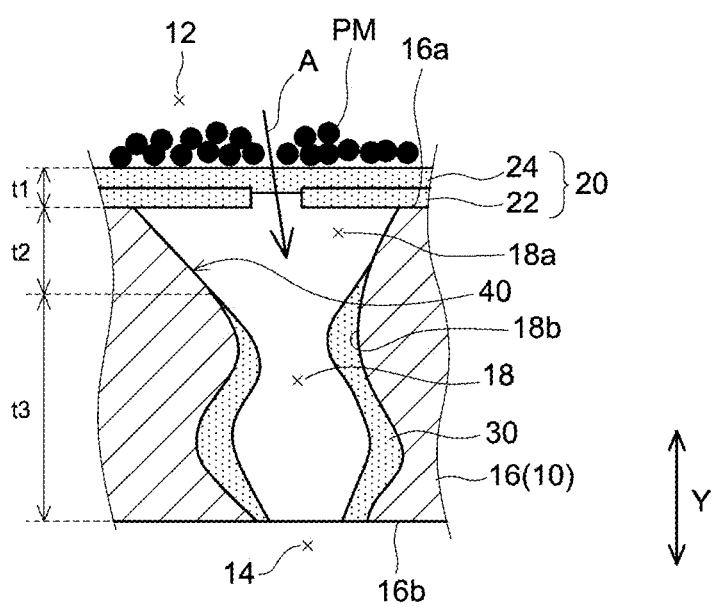
FIG. 6 is a schematic enlarged sectional view of a partition of the particulate filter according to the second embodiment.

The particulate filter disclosed herein is not limited to the first embodiment, and various forms can be employed. A particulate filter according to the second embodiment will be described below. FIG. 5 is a schematic sectional view of a particulate filter according to the second embodiment along a cylinder axis direction. FIG. 6 is a schematic enlarged sectional view of a partition of the particulate filter according to the second embodiment.

1 Inner Coat Layer

As mentioned above, in the particulate filter 1 according to the first embodiment, a coat layer is not formed inside the partition 16 (see FIGS. 3 and 4). However, the technology disclosed herein does not limit the formation of the coat layer to the inside of the partition. For example, as shown in FIGS. 5 and 6, a particulate filter 1A according to the second embodiment includes an inner coat layer 30 formed inside the partition 16 in addition to the outercoat layer 20 formed on the inlet surface 16a of the partition 16. The inner coat layer 30 is formed on the wall surfaces 18b of the pores 18 in a predetermined area from the surface (the outlet surface 16b) of the partition 16 in contact with the outlet cell 14 toward the inlet cell 12.

The inner coat layer 30 contains a noble metal catalyst for purifying hazardous gas components in exhaust gas. In the particulate filter 1A according to the present embodiment, as shown in FIG. 6, the inlets 18a of the pores 18 are covered with the outercoat layer 20 (the lower layer 22 and the upper layer 24). Thus, most of PM in exhaust gas is captured in the inlet cell 12. Thus, in the present embodiment, the improvement in PM capturing performance by narrowing pores 18 as in the conventional art is hardly exhibited. However, when a noble metal catalyst is added to the inner coat layer 30, exhaust gas from which PM has been sufficiently captured can be in contact with the noble metal catalyst. The effect does not occur in the conventional art. As a result, a reduction in catalytic activity due to adhesion of PM to the noble metal catalyst can be avoided, and an excellent purifying performance can be exhibited against hazardous gas components. In other words, the particulate filter 1A according to the second embodiment can appropriately capture PM in the outercoat layer 20, and then can appropriately purify hazardous gas components in the inner coat layer 30. Thus, exhaust gas can be efficiently purified.

In the granules forming the inner coat layer 30, various heat resistant materials can be used as in the outercoat layer 20. Further, the noble metal catalyst to be added to the inner coat layer 30 is not particularly limited, and known materials can be used without particular limitations. These heat resistant materials and noble metal catalysts have already been described. Thus, duplicated duplicate description is omitted. As in the outercoat layer 20, to the inner coat layer 30, various additives (an OSC material, a $NO_x$ adsorbent, a stabilizing agent, and the like) may be added in order to improve catalytic activity of the noble metal catalyst.

The mean particle diameter of the granules in the inner coat layer 30 is preferably smaller than the mean particle diameter of the granules of the upper layer 24 in the outercoat layer 20. If the inner coat layer 30 is formed using granules having a larger particle diameter (a mean particle diameter: from 2.0 μm to 7.0 μm inclusive) such as in the upper layer 24, the inner coat layer 30 may block the pores 18, and pressure drop may rapidly increase. The mean particle diameter of the granules in the inner coat layer 30 is more suitably smaller than that in the lower layer 22 of the outercoat layer 20. This allows for formation of the inner coat layer 30 appropriately adhered to the wall surfaces 18b of the pores 18. Specifically, the mean particle diameter of the granules in the inner coat layer 30 is preferably 2.0 μm or less, more preferably 1.5 μm or less, particularly preferably 1.0 μm or less.

2. Uncoated Area

In the particulate filter 1A according to the second embodiment, an uncoated area 40 in which the coat layer is not substantially present is provided between the outercoat layer 20 and the inner coat layer 30 in the thickness direction Y of the partition 16. In other words, the uncoated area 40 is an area provided from the inlet surface 16a of the partition 16 toward the outlet cell 14, in which most of the wall surfaces 18b of the pores 18 are exposed. As shown in FIG. 6, in the particulate filter 1A according to the present embodiment, most of PM in the exhaust gas is captured by the outercoat layer 20 and is then deposited in the inlet cell 12. However, if very small PM is contained in exhaust gas, the PM may pass through the outercoat layer 20 and enter the inside of the pores 18. In contrast, when the uncoated area 40 is provided between the outercoat layer 20 and the inner coat layer 30, and the inner coat layer 30 is moved away from the inlets 18a of the pores 18, fine PM which has passed through the outercoat layer 20 can be avoided from being deposited in an area where the pores 18 are narrowed by the inner coat layer 30 and blocking the pores 18. Accordingly, a rapid increase in pressure drop can be avoided more suitably.

The description "the coat layer and the catalyst layer are not substantially formed" herein indicates that the coat layer is not intentionally formed on the wall surfaces of the pores. Therefore, the case in which a trace amount of the coat layer is present in an area between the outercoat layer 20 and the inner coat layer 30 is encompassed in the concept that "the coat layer and the catalyst layer are not substantially formed." Whether or not an uncoated area is formed (i.e., whether or not an active coat layer is formed in the area between the outercoat layer and the inner coat layer) can be determined according to the processes described in "Determination of Each Area" below.

A dimension t2 of the uncoated area 40 in the thickness direction Y of the partition 16 is preferably 10 μm or more, more preferably 15 μm or more, particularly preferably 20 μm or more. This allows fine PM which had passed through the outercoat layer 20 from being suitably avoided from adhering to the inner coat layer 30. Further, the upper limit of the dimension t2 of the uncoated area 40 is preferably 100 μm or less, more preferably 90 μm or less, particularly preferably 80 μm or less. This allows the dimension t3 of the area in which the inner coat layer 30 is formed to be sufficiently secured, thereby exhibiting more excellent harmful gas purifying performance.

The particulate filter 1A having an uncoated area 40 can be manufactured according to the following processes. First, the pores 18 in the partition 16 are filled with an organic solid content from the inlet cells 12. Specifically, a pore filling slurry in which the organic solid content is dispersed in a predetermined dispersion medium is prepared and is then introduced into the base material 10 from the inlet cells 12. Then, the suction is applied from the outlet cells 14 of the base material 10 to permeate the pore filling slurry into a predetermined area from the inlet surface 16a of the partition 16 toward the inside of the partition 16. Then, the dispersion medium is removed by a drying process to fill the predetermined area in which the uncoated area 40 is to be formed with the organic solid content. As the organic solid content, any known materials can be used without particular limitations as long as they are burnt off by a firing process which will be described later. Examples of the organic solid content include resin beads formed mainly of polyethylene, polypropylene, melamine resin, polymethyl methacrylate (PMMA) resin, or the like. Other examples thereof include resin fibers such as cellulose microfibers. The particle diameter of the organic solid content is preferably controlled so that the pores 18 in the partition 16 are suitably filled with the organic solid content. For example, when the resin beads are used as the organic solid content, the mean particle diameter is preferably set to about 100 μm or less (more preferably 50 μm or less, yet more preferably 30 μm or less). The concentration of the organic solid content in the pore filling slurry is preferably controlled, as appropriate, according to the porosity of the partition 16 in the base material 10 or the like. As the dispersion medium, any liquid material can be used without particular limitations as long as it does not dissolve the organic solid content. Examples of the dispersion medium include water and alcohol. The pore filling slurry may contain a resin component (cellulose-based resin) which is soluble in this kind of dispersion medium or the like.

Then, a precursor of the outercoat layer 20 is formed on the inlet surface 16a of the partition 16. Specifically, the lower layer slurry is supplied to the inlet cells 12 of the base material 10, followed by suction from the outlet cells 14. At this time, the pores 18 of the partition 16 have been filled with the organic solid content. Thus, the lower layer slurry is less likely to penetrate into the partition 16 and is more likely to adhere to the inlet surface 16a of the partition 16. However, even when the filling with the organic solid content is performed, it is difficult to cause all slurry to appropriately adhere to the inlet surface 16a of the partition 16, and portion of the slurry may enter the inside of the pores 18. Thus, when drying process is performed after the filling with the slurry, many precursors (dried films of the lower layer slurry) having openings 22a are formed on the inlet surface 16a of the partition 16. Therefore, the upper layer 24 needs to be formed to block the openings 22a of the lower layer 22 also in the present embodiment. Specifically, the upper layer slurry is supplied to the inlet cell 12 of the base material 10, followed by suction from the outlet cell 14. This allows the upper layer slurry to adhere to the surface of the precursor in the lower layer 22. Thereafter, the drying process is performed. Thus, a precursor of the outercoat layer 20 including the lower layer 22 and the upper layer 24 is formed on the inlet surface 16a of the partition 16. In the drying process, it is preferable to perform a heating process to the extent that the raw material slurry evaporates and the organic solid content filling the inside of the partition 16 is not burnt off.

Then, a precursor of the inner coat layer 30 is formed inside the partition 16. Here, an inner coat slurry is first allowed to permeate into the partition 16 from the outlet surface 16b of the partition 16. Specifically, the inner coat slurry is supplied to the inside of the outlet cell 14 of the base material 10, followed by suction from the inlet cells 12. Accordingly, the slurry is adhered to the wall surfaces 18b of the pores 18. At this time, an area from the inlet surface 16a of the partition 16 toward the inside of the partition 16 (an area in which an uncoated area 40 is to be formed) is filled with the organic solid content. Thus, the slurry does not permeate into the inlet surface 16a of the partition 16 and remains in the vicinity of the outlet cells 14 in the partition 16. Then, by the drying process and the firing process, the outercoat layer 20 including a lower layer 22 and an upper layer 24 and an inner coat layer 30 in the partition 16 are formed. Further, in the firing process, the organic solid content is burnt off, and an uncoated area 40 is formed in an area filled with the organic solid content (i.e., a predetermined area from the inlet surface 16a of the partition 16 toward the inside of the partition 16). In light of reliably burning the organic solid content off, the temperature in the firing process is preferably 400° C., more preferably 500° C., yet more preferably 600° C. Similarly, in order to reliably fire the organic solid content, the firing time is preferably about 2 hours to about 4 hours.

As can be seen from above, by the processes, a particulate filter 1A including an outercoat layer 20 on the inlet surface 16a of the partition 16, an inner coat layer 30 provided in a predetermined area from the outlet surface 16b of the partition 16 toward the inlet cells 12, and an uncoated area 40 provided between the outercoat layer 20 and the inner coat layer 30 can be manufactured. Many conditions such as the amount of the slurry supplied, the viscosity of the slurry, components of slurry (such as granules, additives), the porosity of the partition of the base material, the pressure during suction, suction time affect the permeation of each slurry in the manufacturing processes. Thus, it is preferable to conduct preliminary tests in which these conditions are changed as appropriate, and various conditions are controlled so that the slurry adheres to an intended area based on the findings by the tests.

The manufacturing method is an example means of manufacturing the particulate filter 1A according to the second embodiment and is not intended to limit the particulate filter 1A. In other words, the method of manufacturing the particulate filter 1A including an outercoat layer 20, an inner coat layer 30, and an uncoated area 40 is not limited to the method. For example, in the present embodiment, the particle diameter of the granules of each of the lower layer 22 and the upper layer 24 is controlled appropriately. Thus, an outercoat layer 20 that covers the inlet surface 16a of the partition 16 can be appropriately formed even if the inside of the partition 16 is not filled with the organic solid content. Then, if the conditions (the pressure during suction, the suction time, and the like) during permeation of the inner coat slurry are controlled appropriately, an appropriate uncoated area 40 can also be formed.

[Determination of Each Area]

The outercoat layer 20, the inner coat layer 30, and the uncoated area 40 in the embodiment can be specified based on the following determination processes (a) to (k). In other words, whether or not the outercoat layer, the inner coat layer, the uncoated area, and the like are provided in the particulate filter can be determined based on the following determination processes (a) A particulate filter to be tested is disassembled, and 10 test pieces each embedding a partition of a base material in a resin are prepared.

(b) The test pieces are scrape off to expose sections of the partitions. Then, the sections of the partitions exposed are observed by a scanning electron microscope (SEM). As a result, section SEM observation images (reflected electron image, observation magnification: ×200) are obtained.

(c) The section SEM observation images are subjected to automatic binarization by using two-dimensional image analysis software (trade name: ImageJ (registered trademark)). As a result, binary image showing only the coat layer is obtained.

(d) The images before and after the automatic binarization are compared, and the coat layer observed on the inlet surface of the partition is regarded as an "outercoat layer."

(e) The "total number of pixels in the coat layer" in the binary image and the "total number of pixels in the entire binary image" were counted. A value obtained by dividing the "total number of pixels in the coat layer" by the "total number of pixels in the entire binary image" is calculated. And the divided value is regarded as a "coat layer abundance ratio in the entire partition."

(f) Images before and after the automatic binarization are compared, an arbitrary area from the outlet surface of the partition toward the inlet cell is set. And a value obtained by dividing the "number of pixels in the coat layer in the set area" by the "total number of pixels in the set area" is calculated. The divided value is regarded as a "coat layer abundance ratio in the set area."

(g) A value obtained by dividing the "coat layer abundance ratio in the set area" by the "coat layer abundance ratio in the entire partition" is calculated, and whether or not the value is a first threshold value or more is determined. The first threshold value is set to, for example, 1.05 (preferably 1.1, more preferably 1.15, yet more preferably 1.2, particularly preferably 1.25)

(h) The "arbitrary area from the outlet surface of the partition toward the inlet cell" described in the process (f) is expanded gradually toward the inlet cell, and the "coat layer abundance ratio in the set area" is calculated each time. And a value obtained by dividing the "coat layer abundance ratio in the set area" by the "coat layer abundance ratio in the entire partition" is calculated. The set area is expanded until the divided value falls below the first threshold value.

(i) If as a result of the process (h), an area in which the value falls below the first threshold value is identified, the area of the predetermined determination is regarded as the "inner coat layer." As a result, an area between the "outercoat layer" and the "inner coat layer" is regarded as a "third area."

(j) A value obtained by dividing "the number of pixels in the coat layer in the third area" by the "total number of pixels in the third area" is calculated. And this divided value is regarded as a "coat layer abundance ratio in the third area." Furthermore, a value obtained by dividing the "coat layer abundance ratio in the third area" by the "coat layer abundance ratio in the entire image" is further calculated. If this divided value is a second threshold value or less, it is determined that the "threshold value" is the "uncoated area" (i.e., the uncoated area is provided between the outercoat layer and the inner coat layer). The second threshold value is set to, for example, 0.65 (preferably 0.5, more preferably 0.4, yet more preferably 0.3, particularly preferably 0.25).

(k) The 10 test pieces are subjected to processes (b) to (j). If an uncoated area between the outercoat layer and the inner coat layer is observed in 50% of the test pieces, it is determined that the particulate filter to be tested is "provided with an uncoated area between the outercoat layer and the inner coat layer."

Next, whether or not the outercoat layer has a multilayer structure including an "upper layer" and a "lower layer" can be determined based on the following determination processes (l) to (n). In the following processes, the sectional SEM observation image of the partition obtained in the process (b) is used.

(l) Equivalent circle diameters of multiple granules (e.g., 10 granules) present on the upper surface of the outercoat layer (in other words, the surface adjacent to the inlet cell) were measured. The outercoat layer in this process is an area regarded as the "outercoat layer" in the process (d). And the "mean particle diameter of the upper layer" is calculated based on the diameters of multiple granules in the upper surface.

(m) Then, equivalent circle diameters of multiple granules (e.g., 10 granules) present on the bottom surface of the outercoat layer (in other words, the interface of the partition with the inlet surface) were measured. The outercoat layer in this process is an area regarded as the "outercoat layer" in the process (d). And the "mean particle diameter of the lower layer" is calculated based on the diameters of multiple granules in the bottom surface (n) Next, the "mean particle diameter of the upper layer" and the "mean particle diameter of the lower layer" are compared to determine whether or not the "mean particle diameter of the upper layer" is larger than the "mean particle diameter of the lower layer." Based on the processes, whether or not the upper layer made of large granules and the lower layer made of small granules are formed in the outercoat layer can be determined.

The "dimensions t1 to t3 in the thickness direction Y (see FIG. 4 or 6)" can be measured based on the interfaces of the areas defined by the determination processes. Specifically, the "dimensions t1 to t3 in the thickness direction Y" herein are each an average value of dimensions of each area observed in the ten test pieces.

OTHER EMBODIMENTS

Embodiments of the particulate filter disclosed herein have been described above. Note that the particulate filter disclosed herein is not limited to the first and second embodiments. For example, in the particulate filters according to the embodiments, an outercoat layer having a two-layer structure including a lower layer and an upper layer is formed. However, the outercoat layer in the particulate filter disclosed herein only necessary to includes the upper layer and the lower layer, and may have a multilayer structure including three or more layers. For example, a third layer that further covers the upper layer may be formed to exhibit a more suitable PM capturing performance. However, if the number of layers in the outercoat layer increases too much, pressure drop tends to increase. Thus, in light of the avoidance of pressure drop, the number of layers in the outercoat layer is preferably four or less, more preferably three or less, particularly preferably two or less.

Further, the particulate filter disclosed herein can be particularly suitably used as a gasoline particulate filter (GPF) for capturing PM exhausted from the gasoline engine. Exhaust gas generated in the gasoline engine has a higher temperature than exhaust gas exhausted from other engines (such as a diesel engine) and thus can easily combusts PM captured in the inlet cells.

Test Examples

Some test examples regarding the present disclosure will be described below. However, it is not intended that the present disclosure is limited to such test examples.
<First Test>

In this test, ten particulate filters were prepared, and the effects of the particle diameter of granules contained in the outercoat layer on the PM capturing performance and the pressure drop suppression function were determined.

1. Production of Test Samples
(1) Sample 1

First, as a base material, a cylindrical honeycomb base material (made of cordierite, the number of cells: 300 cpsi, the thickness of the partition: 8 mill, the average pore diameter: 15 µm, the porosity: 64%) having a base material volumetric capacity of 1.3 L and a length of 114.3 mm was prepared.

Then, a pore filling slurry in which resin beads (powdered cellulose) having a mean particle diameter of 25 µm were dispersed in ion-exchange water was prepared. Then, the pore filling slurry was supplied to the inside of inlet cells of the honeycomb base material, followed by suction from the outlet cells to permeate the pore filling slurry into pores of the partition. Then, a drying process (100° C., 30 minutes) was performed, so that the pores of the partition are filled with the resin beads.

Then, a mixture of an aqueous palladium nitrate solution, an aqueous rhodium nitrate solution, powdered $Al_2O_3$, powdered $CeO_2$, powdered $ZrO_2$, powdered BaO, and an appropriate amount of ion-exchange water was milled to obtain a lower layer dispersion liquid containing lower layer granules having a mean particle diameter of 0.5 µm. Next, the lower layer dispersion liquid, a pore forming material (powdered cellulose having an average long diameter of 25 µm), a solvent (pure water) were mixed at a ratio of 10:1:10. Thus, a lower layer slurry was prepared. Then, the lower layer slurry was supplied into the inlet cells of the honeycomb base material in a coating amount of 50 g/L, followed by suction from the outlet cells to adhere the lower layer slurry to the inlet surface of the partition. Then, a drying process (100° C., 30 minutes) was performed, thereby forming a precursor of the lower layer on the inlet surface of the partition.

Then, the milling was performed in the same manner as for the lower layer granules. Thus, an upper layer dispersion liquid containing upper layer granules having a mean particle diameter of 5 μm was obtained. Next, the upper layer dispersion liquid, a pore forming material (powdered cellulose having an average long diameter of 25 μm), a solvent (pure water) were mixed at a ratio of 30:1:30. Thus, an upper layer slurry was prepared. Then, the upper layer slurry was supplied into the inlet cells in a coating amount of 10 g/L, followed by suction from the outlet cells to apply the upper layer slurry to cover the precursor of the lower layer. Then, a drying process (100° C., 30 minutes) was performed, thereby forming a precursor of the upper layer on the precursor of the lower layer.

Next, an inner coat slurry containing inner coat granules having a mean particle diameter of 0.5 μm was prepared by the same processes as for the lower layer granules. Then, the inner coat slurry was supplied to the outlet cells in a coating amount of 30 g/L, followed by suction from the inlet cells to permeate the slurry from the outlet surface of the partition toward to the inlet cells. Then, a drying process (100° C., 30 minutes) was performed, thereby forming a precursor of the inner coat layer inside the partition. Then, a firing process (500° C., 60 minutes) was performed to burn off the resin beads and fire the precursors of the respective layers. Thus, a particulate filter including an outercoat layer including a lower layer and an upper layer, an uncoated area, and an inner coat layer was produced.

(2) Samples 2 to 7 and A

Seven particulate filters were produced under the same conditions as for Sample 1 except that the mean particle diameter of granules used in each of the upper layer and the lower layer was changed. The mean particle diameters of the granules used in each sample are shown in Table 1.

(3) Samples 8 and 9

Two particulate filters were produced under the same conditions as for Samples 1 to 7 except that an outercoat layer having a monolayer structure was formed. Note that the mean particle diameters of granules forming the outercoat layer differ between Samples 8 and 9. The mean particle diameters of the granules used in each sample are shown in Table 1 to be described later.

2. Evaluation Test (1) Evaluation of PM Capturing Performance

The particulate filter of each sample was installed in a soot generator (DPG, manufactured by Cambustion), and diesel oil was burnt to supply soot to the particulate filter. The number of PM particles discharged on the downstream side of the particulate filter after deposition of 0.02 g/L soot was measured, and the ratio thereof to the number of PM particles discharged immediately below the soot generator was calculated as a PM capturing rate (%). Table 1 shows the measurement results.

(2) Evaluation of Pressure Drop Suppression Function

In this test, the PM deposition pressure drop was also measured at the same time as the measurement of the PM capturing rate. Specifically, during the measurement of the PM capturing rate, the pressure inside a pipe on the upstream side of the particulate filter and the pressure in the pipe on the downstream side of the particulate filter were measured, and a pressure drop (kPa) was calculated based on these pressures. The pressure drop after 1 g/L soot deposition was defined as a "PM deposition pressure drop," and the pressure drop suppression performance was evaluated based on the PM deposition pressure drop. Table 1 shows the measurement results.

TABLE 1

| | Average particle diameter (μm) of each layer | | | Coating amount (g/L) of each layer | | PM capturing rate (%) | PM deposition pressure drop (mbar) |
|---|---|---|---|---|---|---|---|
| | Lower layer | Upper layer | Small particle diameter side | Lower layer | Upper layer | | |
| Sample 1 | 0.5 | 5 | Lower layer | 50 | 10 | 95.7 | 76.8 |
| Sample 2 | 5 | 0.5 | Upper layer | 50 | 10 | 82.3 | 205.7 |
| Sample 3 | 3.5 | 5 | Lower layer | 50 | 10 | 96.4 | 130.5 |
| Sample 4 | 2 | 5 | Lower layer | 50 | 10 | 96.1 | 90.6 |
| Sample 5 | 0.5 | 3.5 | Lower layer | 50 | 10 | 94.6 | 84.3 |
| Sample 6 | 0.5 | 1.5 | Lower layer | 50 | 10 | 80.8 | 110.3 |
| Sample 7 | 3.5 | 2 | Upper layer | 50 | 10 | 84.7 | 172.3 |
| Sample A | 0.5 | 7 | Lower layer | 50 | 10 | 95.4 | 79.4 |
| Sample 8 | 0.5 | | — | 60 | | 76.7 | 91.4 |
| Sample 9 | 5 | | — | 60 | | 78.0 | 150.1 |

As shown in Table 1, in Samples 1, 4, 5, and A, a suitable PM capturing rate of 85% or higher was confirmed, and the PM deposition pressure drop was suppressed to 91 mbar or less. In the case where an outercoat layer having a monolayer structure was formed such as in Samples 8 and 9, the PM capturing rate dropped to 80% or less. This is assumed to be due to the fact that the outercoat layer that appropriately cover the inlets of the pores was not formed, causing PM to pass toward the outlet cells. As shown in Samples 2 and 7, in the case where the lower layer granules were larger than the upper layer granules, a rapid increase in PM deposition pressure drop was confirmed. This is assumed to be due to blocking of pores of the partition by the lower layer granules. As shown in Samples 3 and 6, even in the case where the lower layer granules were smaller than the upper layer granules, a decrease in PM capturing rate and an increase in PM deposition pressure drop occurred.

This demonstrates that a sufficient effect may not be obtained merely by defining the relative sizes of the lower layer granules and the upper layer granules, and it is necessary to control the particle diameter of the granules in each layer to satisfy the predetermined particle diameter.

<Second Test>

In this test, four particulate filters were prepared, and the effects of the coating amounts of the upper layer and the lower layer on the PM capturing performance and the pressure drop suppression function were determined.

1. Production of Test Samples

In this test, three particulate filters were prepared (Samples 10 to 12) by the same processes as for Sample 1 in the first test except that the coating amount of each layer was changed. In this test, in addition to Samples 10 to 12, Sample 1 prepared in the first test was prepared. The mean particle diameter and the coating amount of the outercoat layer in each sample are shown in Table 2.

2. Evaluation Test

In this test, the PM capturing performance and the pressure drop suppression function were evaluated by the same processes as in the first test. Table 2 shows the evaluation results.

TABLE 2

|  | Average particle diameter (μm) of each layer | | | Coating amount (g/L) of each layer | | PM capturing rate (%) | PM deposition pressure drop (mbar) |
| --- | --- | --- | --- | --- | --- | --- | --- |
|  | Lower layer | Upper layer | Small particle diameter side | Lower layer | Upper layer | | |
| Sample 1 | 0.5 | 5 | Lower layer | 50 | 10 | 95.7 | 76.8 |
| Sample 10 | 0.5 | 5 | Lower layer | 40 | 20 | 96.4 | 81.1 |
| Sample 11 | 0.5 | 5 | Lower layer | 30 | 30 | 96.8 | 94.1 |
| Sample 12 | 0.5 | 5 | Lower layer | 10 | 50 | 95.2 | 143.6 |

As shown in Table 2, in all of Samples 1 and 10 to 12, suitable PM capturing rates of 85% or higher were confirmed. In Samples 11 and 12, the PM deposition pressure drop increased compared with other samples. This demonstrates that in production of the particulate filter having an excellent pressure drop suppression function, the coating amount of the lower layer needs to be higher than the coating amount of the upper layer.

<Third Test>

In this test, seven particulate filters were prepared, and the effects of the porosities of the upper layer and the lower layer on the PM capturing performance and the pressure drop suppression function were determined.

1. Production of Test Samples

In this test, six particulate filters (Samples 13 to 18) with different amounts of pore forming material added from Sample 1 were prepared. In this test, in addition to Samples 13 to 18, Sample 1 prepared in the first test was prepared. In this test, the porosity of each of the upper layer and the lower layer was measured by the following processes. Table 1 shows the measurement results.

(Porosity Measurement Processes)

Figure 7:
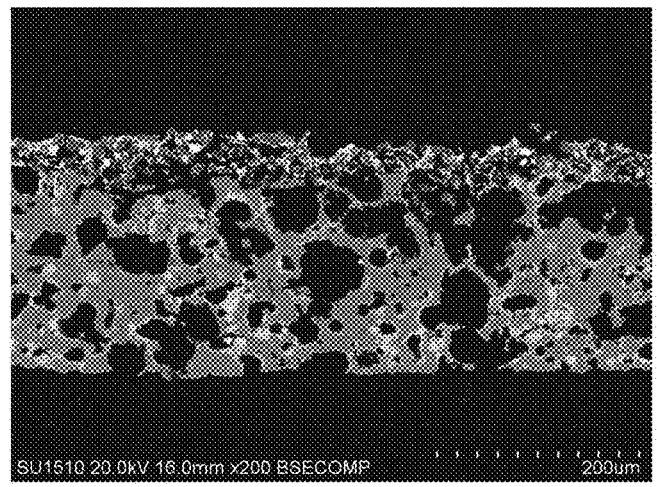
FIG. 7 is a sectional SEM photograph of a section of a partition of a particulate filter of Sample 1 taken at a ×200 magnification.

(a) The partition of the base material is cut out from the particulate filter, and test pieces each embedding the partition in a resin are prepared. Then, the section of the partition is cut to expose the section of the partition, and a SEM observation image of the section (reflected electron image, observation magnification: ×200) is obtained. (As an example, the sectional SEM observation image of the partition of Sample 1 is shown in FIG. 7.)

Figure 8:
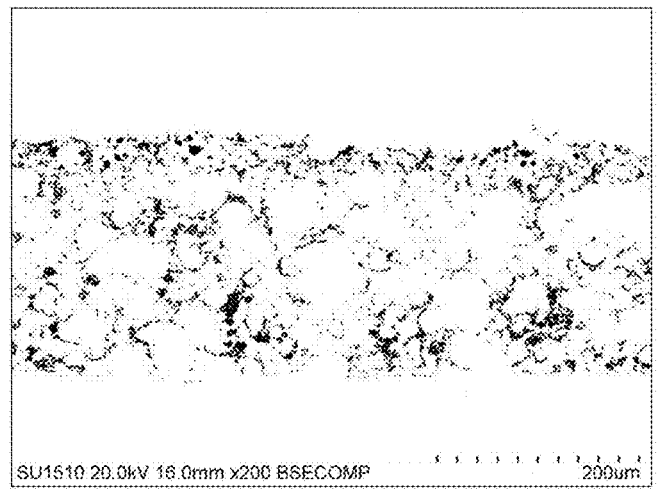
FIG. 8 is an image of a binarized sectional SEM photograph of FIG. 7.

(c) The sectional SEM observation image is subjected to automatic binarization (discriminant analysis) using image analysis software ((ImageJ), to obtain a binary image extracting the framework of the partition and the catalyst layer. (As an example, a binary image of Sample 1 is shown in FIG. 8.)

(c) The total area of a portion corresponding to the upper layer of the outercoat layer (the total area of a black portion and a white portion in the binary image) is measured, while the area of the coat layer in a portion corresponding to the upper layer (the area of the black portion in the binary image) is measured.

(d) The porosity of the upper layer is calculated based on the following equation (1).

$$\text{Porosity (\%)} = (\text{Total area} - \text{Area of coat layer})/\text{Total area} \times 100 \quad (1)$$

(c) The total area of a portion corresponding to the lower layer of the outercoat layer (the total area of a black portion and a white portion in the binary image) is measured, while the area of the coat layer in a portion corresponding to the upper layer (the area of the black portion in the binary image) is measured.

(f) The porosity of the lower layer is calculated based on the equation (1).

2. Evaluation Test

In this test, the PM capturing performance and the pressure drop suppression function were evaluated by the same processes as in the first test. Table 3 shows the evaluation results.

TABLE 3

|  | Average particle diameter (μm) of each layer | | | Porosity (%) of each layer | | PM capturing rate (%) | PM deposition pressure drop (mbar) |
| --- | --- | --- | --- | --- | --- | --- | --- |
|  | Lower layer | Upper layer | Small particle diameter side | Lower layer | Upper layer | | |
| Sample 1 | 0.5 | 5 | Lower layer | 38.5 | 24.5 | 95.7 | 76.8 |
| Sample 13 | 0.5 | 5 | Lower layer | 24.2 | 37.8 | 91.3 | 70.1 |

TABLE 3-continued

|  | Average particle diameter (μm) of each layer | | | Porosity (%) of each layer | | PM capturing | PM deposition |
|---|---|---|---|---|---|---|---|
|  | Lower layer | Upper layer | Small particle diameter side | Lower layer | Upper layer | rate (%) | pressure drop (mbar) |
| Sample 14 | 0.5 | 5 | Lower layer | 40.6 | 36.0 | 92.5 | 65.2 |
| Sample 15 | 0.5 | 5 | Lower layer | 56.8 | 24.8 | 94.7 | 73.5 |
| Sample 16 | 0.5 | 5 | Lower layer | 13.3 | 12.4 | 95.9 | 112.3 |
| Sample 17 | 0.5 | 5 | Lower layer | 38.3 | 64.2 | 88.9 | 63.8 |
| Sample 18 | 0.5 | 5 | Lower layer | 68.1 | 63.8 | 86.9 | 61.2 |

As shown in Table 3, in all of Samples 1 and 13 to 18, suitable PM capturing rates of 85% or higher were confirmed. Among these samples, Samples 1, 14, 15, and 16 showed particularly excellent PM capturing rates. This demonstrates that when the porosity of the lower layer is larger than the porosity of the upper layer, the PM capturing performance tends to further improve. However, Sample 18 did not show a significant improvement in PM capturing performance even though the porosity of the lower layer was larger than the porosity of the upper layer. This demonstrates that a suitable improvement in PM capturing rate is achieved by setting the porosity of the lower layer to 65% or less and the porosity of the upper layer to 60% or less. Further, in Sample 16, the PM deposition pressure drop slightly increased. This demonstrates that suitable pressure drop suppression function is achieved by setting the porosity of the lower layer to 20% or more and the porosity of the upper layer to 15% or more.

<Fourth Test>

In this test, four particulate filters were prepared, and the effects of the presence or absence of the coat layer (inner coat layer) formed inside the partition on the PM capturing performance and the pressure drop suppression function were determined.

1. Production of Test Samples

In this test, a particulate filter (Sample 19) produced by the same processes as for Sample 1 except that the inner coat layer was not formed was prepared. In this test, in addition to Sample 19, Samples 1, 8, and 9 each having an inner coat layer produced in the first test were prepared. Configurations of the outercoat layer and the inner coat layer in each sample are shown in Table 4.

2. Evaluation Test

In this test, the PM capturing performance and the pressure drop suppression function were evaluated by the same processes as in the first test. Table 4 shows the evaluation results.

TABLE 4

|  | Average particle diameter (μm) of each layer | | | Inner coat layer | PM capturing rate (%) | PM deposition pressure drop (mbar) |
|---|---|---|---|---|---|---|
|  | Lower layer | Upper layer | Small particle diameter side | | | |
| Sample 1 | 0.5 | 5 | Lower layer | Present | 95.7 | 76.8 |
| Sample 8 | 0.5 | | — | Present | 76.7 | 91.4 |
| Sample 9 | | 5 | — | Present | 78.0 | 150.1 |
| Sample 19 | 0.5 | 5 | Lower layer | Absent | 93.5 | 83.0 |

As shown in Table 4, in Samples 1 and 19, the PM capturing rate and the PM deposition pressure drop were both improved as compared with Samples 8 and 9. No significant difference occurred between Samples 1 and 19 in terms of the PM capturing rate. This demonstrates that when the inlets of the pores are appropriately covered by the outercoat layer, PM is captured outside the partition, so that the presence or absence of the inner coat layer has no effect on the PM capturing performance. Further, Sample 1 having an inner coat layer showed a slightly lower PM deposition pressure drop than Sample 19. This is assumed to be due to the fact that fine PM entering inside the partition is easily burnt by the catalytic action of the noble metal catalyst (especially Pd) in the inner coat layer.

<Fifth Test>

In this test, the effects of the particle diameter of granules contained in the outercoat layer on catalytic activity of the noble metal catalyst.

1. Production of Test Samples 46

In this test, a particulate filter (Sample 20) produced by the same processes as in Sample 1 except that the mean particle diameter of the lower layer granules was changed to 0.3 μm was prepared. In this test, in addition to Sample 20, Sample 1 prepared in the first test was prepared. A configuration of the outercoat layer in each sample is shown in Table 5.

2. Evaluation Test

Unlike the first to fourth tests, this test evaluated the purifying performance for hazardous gas components in exhaust gas. Specifically, first, each sample was subjected to a durability test in which an environment of 950° C. was maintained for 45 hours. The particulate filter after the durability test was installed in an exhaust system of an engine bench, exhaust gas was then supplied while the temperature was increased from 50° C. at a temperature rising rate of 10° C./min, and the concentrations of a hazardous gas component (here, hydrocarbon (HC)) at a pipe on the upstream side and a pipe on the downstream side of the particulate filter were measured. The exhaust gas temperature at which the HC concentration measured at the pipe on the downstream side reached 50 mol % or less of the HC concentration measured at the pipe on the upstream side was defined as a T50 catalytic activity (° C.), and the evaluation was performed. Table 5 shows the results. The lower the T50 catalytic activity, the lower temperature at which the hazardous gas components can be purified. Thus, it can be said that the purifying performance against hazardous gas components is excellent.

TABLE 5

|  | Average particle diameter (μm) of each layer | | | Coating amount (g/L) of each layer | | T50 catalytic activity (° C.) |
| --- | --- | --- | --- | --- | --- | --- |
|  | Lower layer | Upper layer | Small particle diameter side | Lower layer | Upper layer |  |
| Sample 1 | 0.5 | 5 | Lower layer | 50 | 10 | 387 |
| Sample 20 | 0.3 | 5 | Lower layer | 50 | 10 | 403 |

As shown in Table 5, it was confirmed that the particulate filter of Sample 1 has lower T50 catalytic activity than Sample 20 and has an excellent hazardous gas purifying performance. This demonstrates that if the mean particle diameter of the lower layer granules is too small, the hazardous gas purifying performance may reduce when the noble metal catalyst is added. This is assumed to be due to the fact that if the lower layer granules are too small, sintering between granules is promoted, thereby reducing the catalytic activity of the noble metal catalyst. This demonstrates the technology disclosed herein can exhibit a particularly suitable effect on the particulate filter (the filter catalyst) with the noble metal catalyst in the coat layer.

Although specific examples of the present disclosure have been described in detail above, they are mere examples and does not limit the appended claims. The technology described is the appended claims include various modifications and changes of the foregoing specific examples.

INDUSTRIAL APPLICABILITY

According to the present invention, a particulate filter that can appropriately avoid PM from passing toward the outlet cells and can exhibit an excellent PM capturing performance can be provided.

The invention claimed is:

1. A particulate filter disposed in an exhaust system of an internal combustion engine and used to capture a particulate matter in exhaust gas exhausted from the internal combustion engine, the particulate filter comprising:
a wall-flow type base material having an inlet cell with an opening only at an exhaust gas inlet end, an outlet cell with an opening only at an exhaust gas outlet end, and a porous partition partitioning the inlet cell and the outlet cell; and
an outercoat layer that is a porous layer including multiple granules and is provided on a surface of the partition in contact with the inlet cell, wherein the outercoat layer at least includes:
a lower layer provided on the surface of the partition in contact with the inlet cell; and
an upper layer provided to cover the lower layer, a mean particle diameter of the granules in the upper layer is larger than a mean particle diameter of the granules in the lower layer, the mean particle diameter of the granules in the lower layer is from 0.4 μm to 2.0 μm inclusive, and the mean particle diameter of the granules in the upper layer is from 2.0 μm to 7.0 μm.

2. The particulate filter according to claim 1, wherein the granules contain at least one selected from the group consisting of alumina, ceria, zirconia, silica, magnesia, and calcia.

3. The particulate filter according to claim 1, wherein the granules contain a noble metal catalyst for purifying a hazardous gas component in the exhaust gas.

4. The particulate filter according to claim 1, wherein a coating amount of the lower layer is higher than a coating amount of the upper layer.

5. The particulate filter according to claim 1, wherein the coating amount of the lower layer per 1 L of the base material is from 30 g/L to 50 g/L inclusive.

6. The particulate filter according to claim 1, wherein the coating amount of the upper layer per 1 L of the base material is from 10 g/L to 30 g/L inclusive.

7. The particulate filter according to claim 1, wherein a porosity of the lower layer is higher than a porosity of the upper layer.

8. The particulate filter according to claim 1, wherein the porosity of the lower layer is from 20% to 65% inclusive.

9. The particulate filter according to claim 1, wherein the porosity of the upper layer is from 15% to 60% inclusive.

10. The particulate filter according to claim 1, wherein an average pore diameter of the partition is from 5 μm to 50 μm inclusive.

11. The particulate filter according to claim 1, wherein a porosity of the partition is 30% to 90%.

12. The particulate filter according to claim 1, further comprising:
an inner coat layer that is provided on wall surfaces of pores in a predetermined area extending from a surface of the partition in contact with the outlet cell to the inlet cell and that contains a noble metal catalyst for purifying the hazardous gas component in the exhaust gas.

13. The particulate filter according to claim 12, wherein an uncoated area in which a coat layer is substantially not present is provided between the outercoat layer and the inner coat layer in a thickness direction of the partition.

14. The particulate filter according to claim 13, wherein a dimension of the uncoated area in the thickness direction of the partition is from 10 μm to 100 μm inclusive.

15. The particulate filter according to claim 1, wherein the internal combustion engine is a gasoline engine.

16. The particulate filter according to claim 2, wherein the granules contain a noble metal catalyst for purifying a hazardous gas component in the exhaust gas.

17. The particulate filter according to claim 2, wherein a coating amount of the lower layer is higher than a coating amount of the upper layer.

18. The particulate filter according to claim 2, wherein the coating amount of the lower layer per 1 L of the base material is from 30 g/L to 50 g/L inclusive.

19. The particulate filter according to claim 2, wherein the coating amount of the upper layer per 1 L of the base material is from 10 g/L to 30 g/L inclusive.

20. The particulate filter according to claim 2, wherein a porosity of the lower layer is higher than a porosity of the upper layer.

* * * * *